US011356157B2

(12) United States Patent
Lehtimaki

(10) Patent No.: US 11,356,157 B2
(45) Date of Patent: Jun. 7, 2022

(54) DYNAMIC SWITCH PATTERN SELECTION FOR ANGLE OF ARRIVAL

(71) Applicant: Silicon Laboratories Inc., Austin, TX (US)

(72) Inventor: Sauli Johannes Lehtimaki, Nummela (FI)

(73) Assignee: Silicon Laboratories Inc., Austin, TX (US)

( * ) Notice: Subject to any disclaimer, the term of this patent is extended or adjusted under 35 U.S.C. 154(b) by 166 days.

(21) Appl. No.: 16/904,941

(22) Filed: Jun. 18, 2020

(65) Prior Publication Data

US 2021/0399775 A1 Dec. 23, 2021

(51) Int. Cl.
| | |
|---|---|
| *G01S 3/06* | (2006.01) |
| *G01S 3/48* | (2006.01) |
| *G01S 3/10* | (2006.01) |
| *H04B 7/06* | (2006.01) |
| *H04W 4/80* | (2018.01) |

(52) U.S. Cl.
CPC ............. *H04B 7/0602* (2013.01); *G01S 3/06* (2013.01); *G01S 3/10* (2013.01); *G01S 3/48* (2013.01); *H04W 4/80* (2018.02)

(58) Field of Classification Search
CPC .......... H04B 7/0602; H04W 4/80; G01S 3/06; G01S 3/10; G01S 3/48
See application file for complete search history.

(56) References Cited

U.S. PATENT DOCUMENTS

| | | | | |
|---|---|---|---|---|
| 10,476,539 | B1 * | 11/2019 | Berger | H04B 7/0885 |
| 11,224,003 | B2 * | 1/2022 | Abe | H04W 48/10 |
| 2014/0357294 | A1 * | 12/2014 | Rajakarunanayake | H04W 64/00 455/456.1 |
| 2018/0287687 | A1 * | 10/2018 | Wu | H04W 52/02 |
| 2019/0394209 | A1 * | 12/2019 | Urabe | G01S 5/12 |
| 2020/0178054 | A1 | 6/2020 | Smileysky | |

(Continued)

OTHER PUBLICATIONS

Cominelli et al., "Dead on Arrival: An Empirical Study of the Bluetooth 5.1 Positioning System", Sep. 2, 2019.

(Continued)

*Primary Examiner* — Janice N Tieu
(74) *Attorney, Agent, or Firm* — Nields, Lemack & Frame, LLC

(57) ABSTRACT

A device and method for improving the accuracy of angle of arrival and departure computations is disclosed. The device and method rely on manipulation of the antenna switching pattern to achieve an improved calculation of arrival angle. In one embodiment, the device calculates an estimate angle of arrival using conventional methods. The device then determines which of a plurality of different antenna switching pattern yields the more accurate results at this estimated angle of arrival. The AoA measurement is then repeated using the preferred antenna switching pattern. In another embodiment, the device captures the amplitude and/or phase of the signal from each antenna element. The device then sorts these antenna elements and defines a preferred antenna switching pattern based on the sort list. The AoA measurement is then performed using the preferred antenna switching pattern. In another embodiment, neural networks may be utilized to determine the preferred antenna switching pattern.

19 Claims, 10 Drawing Sheets

(56) References Cited

U.S. PATENT DOCUMENTS

2021/0096207 A1    4/2021  Torrini et al.
2021/0281519 A1\*  9/2021  Horikawa ............ H04W 4/029
2021/0396833 A1   12/2021  Lehtimaki
2021/0399776 A1   12/2021  Lehtimaki

OTHER PUBLICATIONS

Notice of Allowance dated Mar. 21, 2022 in co-pending U.S. Appl. No. 16/904,942.

\* cited by examiner

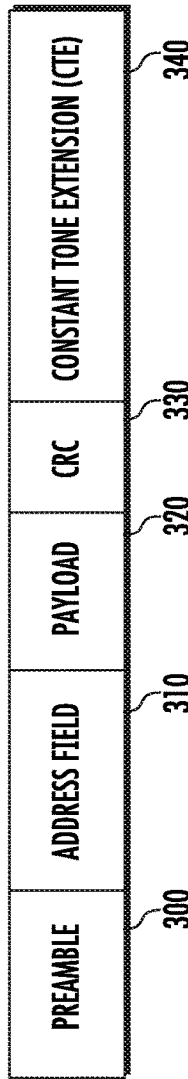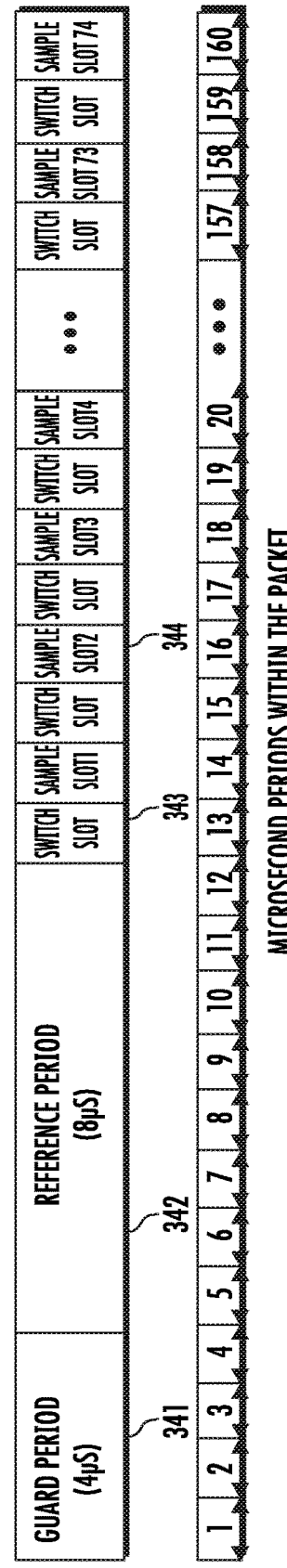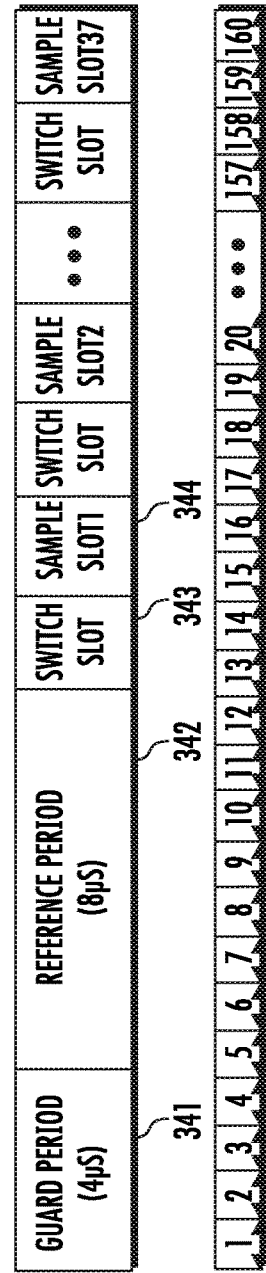

DYNAMIC SWITCH PATTERN SELECTION FOR ANGLE OF ARRIVAL

This disclosure describes systems and methods for optimization of the antenna switching pattern, and more particularly changing the antenna switching pattern to maximize the accuracy of the direction finding algorithm.

BACKGROUND

Angle of Arrival and Angle of Departure algorithms, collectively referred to as AoX algorithms, operate by determining a phase difference between different antenna elements in an antenna array. The antenna array may be a one or two dimensional array. This phase difference can be used to determine the angle from which the signal originated, since the distance between antenna elements is known.

Specifically, assume a one dimensional antenna array where the distance between two adjacent antenna elements is d. The phase difference between when the incoming signal is detected at these two adjacent antennas can be given as φ. This phase difference, φ, divided by 2π, multiplied by the wavelength, λ, represents the distance between the two antenna elements, as viewed from the signal source. Knowing this difference in the distance that the incoming signal travelled allows the angle of arrival to be calculated. Specifically, the angle of arrival can be given by the difference in the distance that the incoming signal travelled, divided by d represents the cosine of the incoming signal. In other words, the angle of arrival is defined as the arc cosine of $(\varphi\lambda/2\pi)/d$.

This algorithm, and others, relies on the accuracy of several parameters. Specifically, the distance between adjacent antenna elements must be accurate. This is typically not problematic, as the geometry of the antenna array is well defined. The algorithm also relies on the quality of the incoming signal. Specifically, the quality of the I and Q signals is critical for accurate operation of any direction finding algorithm. In many systems, signals from the various elements of the antenna array are multiplexed and utilize common electronics. These common electronics may include inductive or capacitive elements that cannot be switched instantaneously and therefore have settling delays.

However, many protocols allow only a predetermined amount of time to acquire signals from all of the antenna elements. Therefore, the device performing the direction finding algorithm must acquire the necessary signals from each element of the antenna array in a timely manner, despite the settling delays noted above.

Therefore, it would be beneficial if there were a system and method that minimized the settling delays so that accurate I and Q signals can be obtained and evaluated. In this way, the accuracy of the AoX algorithm can be improved.

SUMMARY

A device and method for improving the accuracy of angle of arrival and departure computations is disclosed. The device and method rely on manipulation of the antenna switching pattern to achieve an improved calculation of arrival angle. In one embodiment, the device calculates an estimate angle of arrival using conventional methods. The device then determines which of a plurality of different antenna switching pattern yields the more accurate results at this estimated angle of arrival. The AoA measurement is then repeated using the preferred antenna switching pattern.

In another embodiment, the device captures the amplitude and/or phase of the signal from each antenna element. The device then sorts these antenna elements and defines a preferred antenna switching pattern based on the sort list. The AoA measurement is then performed using the preferred antenna switching pattern. In another embodiment, the device utilizes a neural network which is trained using I and Q signals and provides an indication of the preferred antenna switching pattern.

According to one embodiment, a device to calculate an angle of arrival or an angle of departure is disclosed. The device comprises a wireless network interface, wherein the wireless network interface comprises an antenna array having a plurality of antenna elements and an analog multiplexer, wherein the wireless network interface receives an incoming signal from an antenna element and generates an I signal and a Q signal associated with the antenna element; a processing unit; and a memory device, comprising instructions, which when executed by the processing unit, enable the device to: receive a packet that includes a constant tone extension (CTE), wherein the CTE comprises a tone having a known frequency and wherein the CTE comprises a plurality of switch slots and a plurality of sample slots; sample the CTE during a plurality of the sample slots using a default antenna switching pattern, wherein an antenna switching pattern determines an order in which the analog multiplexer selects each antenna element of the antenna array; use I and Q signals from the plurality of sample slots to calculate an estimated angle of arrival; select a preferred antenna switching pattern based on a predetermined relationship between the estimated angle of arrival and a plurality of antenna switching patterns; sample the CTE during a plurality of the sample slots using the preferred antenna switching pattern; and use I and Q signals from the plurality of sample slots to calculate an angle of arrival. In certain embodiments, the memory device comprises the plurality of antenna switching patterns. In some embodiments, the predetermined relationship associates each estimated angle of arrival with one of the plurality of antenna switching patterns. In certain embodiments, the antenna switching pattern associated with each estimated angle of arrival minimizes an absolute error, wherein the absolute error is defined as an absolute value of a difference between the estimated angle of arrival and an actual angle of arrival. In another embodiment, the predetermined relationship associates ranges of estimated angles of arrival with one of the plurality of antenna switching patterns. In certain embodiments, the angle of arrival calculated using the preferred antenna switching pattern is used to select an updated preferred antenna switching pattern based on the predetermined relationship between the angle of arrival and a plurality of antenna switching patterns; and the instructions enable the device to: sample the CTE during a plurality of the sample slots using the updated preferred antenna switching pattern; and use I and Q signals from the plurality of sample slots to calculate an improved angle of arrival.

According to another embodiment, a method for calculating an angle of arrival or an angle of departure is disclosed. The method comprises using a device having a wireless network interface, wherein the wireless network interface comprises an antenna array having a plurality of antenna elements and an analog multiplexer, wherein the wireless network interface receives an incoming signal from an antenna element and generates an I signal and a Q signal associated with the antenna element, to receive a packet that includes a constant tone extension (CTE), wherein the CTE comprises a tone having a known frequency and wherein the CTE comprises a plurality of switch slots and a plurality of sample slots; sampling the CTE during a plurality of the sample slots using a default antenna switching pattern, wherein an antenna switching pattern determines an order in which the analog multiplexer selects each antenna element of the antenna array; using I and Q signals from the plurality of sample slots to calculate an estimated angle of arrival; selecting a preferred antenna switching pattern based on a predetermined relationship between the estimated angle of arrival and a plurality of antenna switching patterns; sampling the CTE during a plurality of the sample slots using the preferred antenna switching pattern; and using I and Q signals from the plurality of sample slots to calculate an angle of arrival. In certain embodiments, the preferred antenna switching pattern is selected from one of a plurality of antenna switching patterns. In some embodiments, the predetermined relationship associates each estimated angle of arrival with one of the plurality of antenna switching patterns. In certain embodiments, the predetermined relationship associates ranges of estimated angles of arrival with one of the plurality of antenna switching patterns. In some embodiments, the predetermined relationship is created by: disposing a beacon at a fixed location; rotating a test device having an antenna configuration that is identical to the antenna array of the device, wherein the test device is rotated through 360 degrees of azimuth; sampling the CTE from the beacon to calculate a computed angle of arrival for a plurality of azimuth angles; creating an error profile for each of a plurality of antenna switching patterns, wherein the error profile represents a difference between an actual angle of arrival and the computed angle of arrival; and minimizing the absolute error at each azimuth angle based on the error profiles. In certain embodiments, minimizing the absolute error at each azimuth angle is performed by: for each antenna switching pattern, determining the difference between an actual angle of arrival and the computed angle of arrival; selecting the antenna switching pattern having a smallest absolute value of the difference. In certain embodiments, the method further comprises: selecting an updated preferred antenna switching pattern using the angle of arrival calculated using the preferred antenna switching pattern, based on the predetermined relationship between the angle of arrival and a plurality of antenna switching patterns; sampling the CTE during a plurality of the sample slots using the updated preferred antenna switching pattern; and using I and Q signals from the plurality of sample slots to calculate an improved angle of arrival.

According to another embodiment, a software program is disclosed. The software program comprises instructions, which when executed by a processing unit disposed on a device a wireless network interface, wherein the wireless network interface comprises an antenna array having a plurality of antenna elements and an analog multiplexer, wherein the wireless network interface receives an incoming signal from an antenna element and generates an I signal and a Q signal associated with the antenna element, enable the device to: receive a packet that includes a constant tone extension (CTE), wherein the CTE comprises a tone having a known frequency and wherein the CTE comprises a plurality of switch slots and a plurality of sample slots; sample the CTE during a plurality of the sample slots using a default antenna switching pattern, wherein an antenna switching pattern determines an order in which the analog multiplexer selects each antenna element of the antenna array; use I and Q signals from the plurality of sample slots to calculate an estimated angle of arrival; select a preferred antenna switching pattern based on a predetermined relationship between the estimated angle of arrival and a plurality of antenna switching patterns; sample the CTE during a plurality of the sample slots using the preferred antenna switching pattern; and use I and Q signals from the plurality of sample slots to calculate an angle of arrival. In certain embodiments, the software program comprises a plurality of antenna switching patterns. In some embodiments, the predetermined relationship associates each estimated angle of arrival with one of the plurality of antenna switching patterns. In some embodiments, the antenna switching pattern associated with each estimated angle of arrival minimizes an absolute error, wherein the absolute error is defined as an absolute value of a difference between the estimated angle of arrival and an actual angle of arrival. In some embodiments, the software program further comprises instructions that enable the device to: select an updated preferred antenna switching pattern using the angle of arrival calculated using the preferred antenna switching pattern, based on the predetermined relationship between the angle of arrival and a plurality of antenna switching patterns; sample the CTE during a plurality of the sample slots using the updated preferred antenna switching pattern; and use I and Q signals from the plurality of sample slots to calculate an improved angle of arrival.

BRIEF DESCRIPTION OF THE DRAWINGS

For a better understanding of the present disclosure, reference is made to the accompanying drawings, in which like elements are referenced with like numerals, and in which:

FIG. 3A-3C shows the format of a representative direction detection message transmitted to the system of FIG. 1;

DETAILED DESCRIPTION

Figure 1:
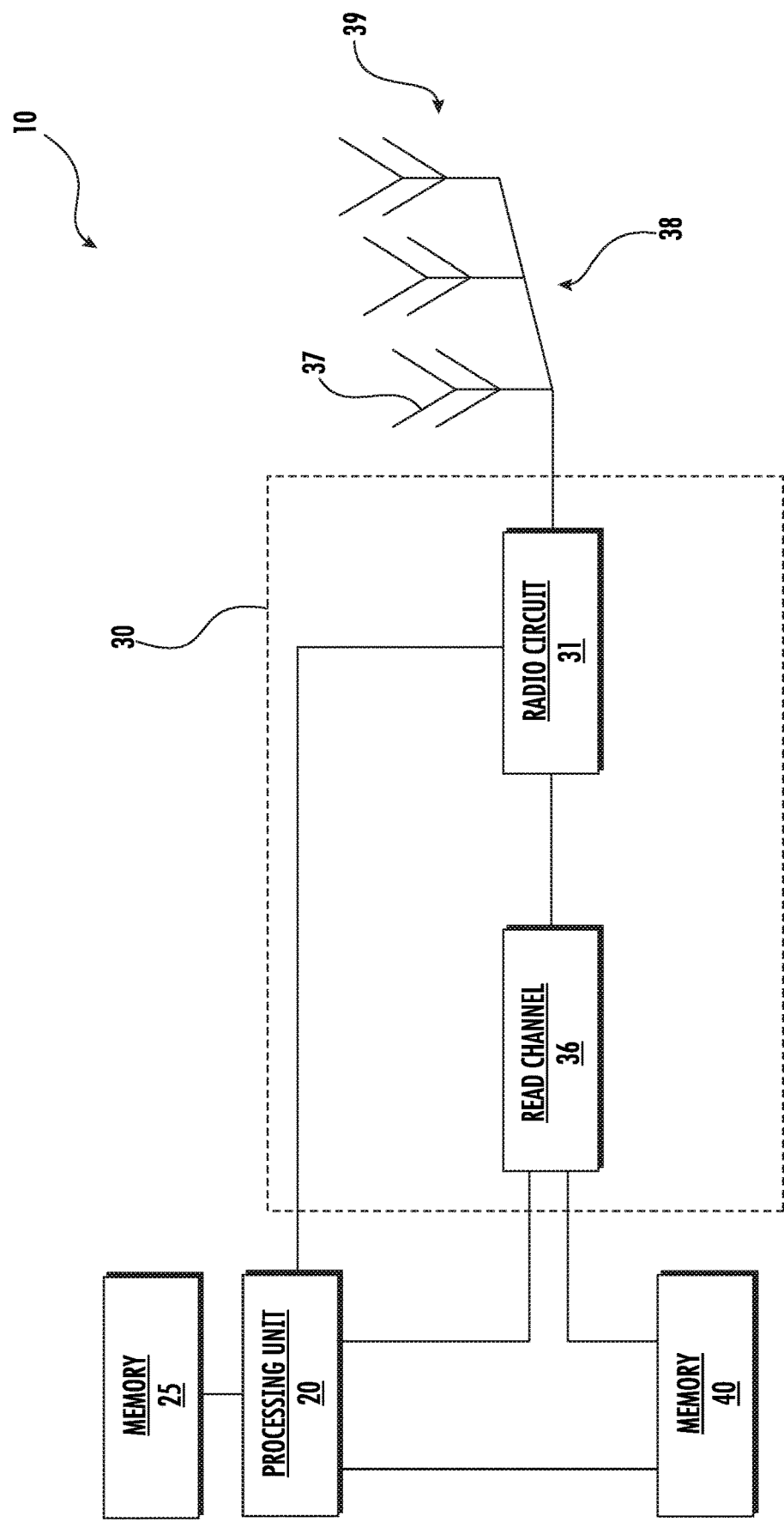
FIG. 1 is a block diagram of a network device that may be used to perform the method described herein.

FIG. 1 shows a network device that may be used to perform the dynamic antenna switching described herein. This dynamic antenna switching may be utilized with angle of arrival (AoA) or angle of departure (AoD) algorithms.

The network device 10 has a processing unit 20 and an associated memory device 25. The processing unit 20 may be any suitable component, such as a microprocessor, embedded processor, an application specific circuit, a programmable circuit, a microcontroller, or another similar device. The memory device 25 contains the instructions, which, when executed by the processing unit 20, enable the network device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM. The instructions contained within the memory device 25 may be referred to as a software program, which is disposed on a non-transitory storage media.

The network device 10 also includes a network interface 30, which may be a wireless network interface that includes an antenna array 38. The antenna array 38 may comprise a plurality of antenna elements 37. The network interface 30 may support any wireless network protocol that supports AoX determination, such as Bluetooth. The network interface 30 is used to allow the network device 10 to communicate with other devices disposed on the network 39.

The network interface 30 include radio circuit 31. This radio circuit 31 is used to process the incoming signal and convert the wireless signals to digital signals. The components within the radio circuit 31 are described in more detail below.

The network interface 30 also includes a read channel 36. The read channel 36 is used to receive, synchronize and decode the digital signals received from the radio circuit 31. Specifically, the read channel 36 has a preamble detector that is used to identify the start of an incoming packet. The read channel 36 also has a sync detector, which is used to identify a particular sequence of bits that are referred to as a sync character. Additionally, the read channel 36 has a decoder which is used to convert the digital signals into properly aligned bytes of data.

The network device 10 may include a second memory device 40. Data that is received from the network interface 30 or is to be sent via the network interface 30 may also be stored in the second memory device 40. This second memory device 40 is traditionally a volatile memory.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 1. The second computer readable non-transitory media may be a CDROM, or a different memory device, which is located remote from the network device 10. The instructions contained on this second computer readable non-transitory media may be downloaded onto the memory device 25 to allow execution of the instructions by the network device 10.

While the processing unit 20, the memory device 25, the network interface 30 and the second memory device 40 are shown in FIG. 1 as separate components, it is understood that some or all of these components may be integrated into a single electronic component. Rather, FIG. 1 is used to illustrate the functionality of the network device 10, not its physical configuration.

Although not shown, the network device 10 also has a power supply, which may be a battery or a connection to a permanent power source, such as a wall outlet.

Figure 2:
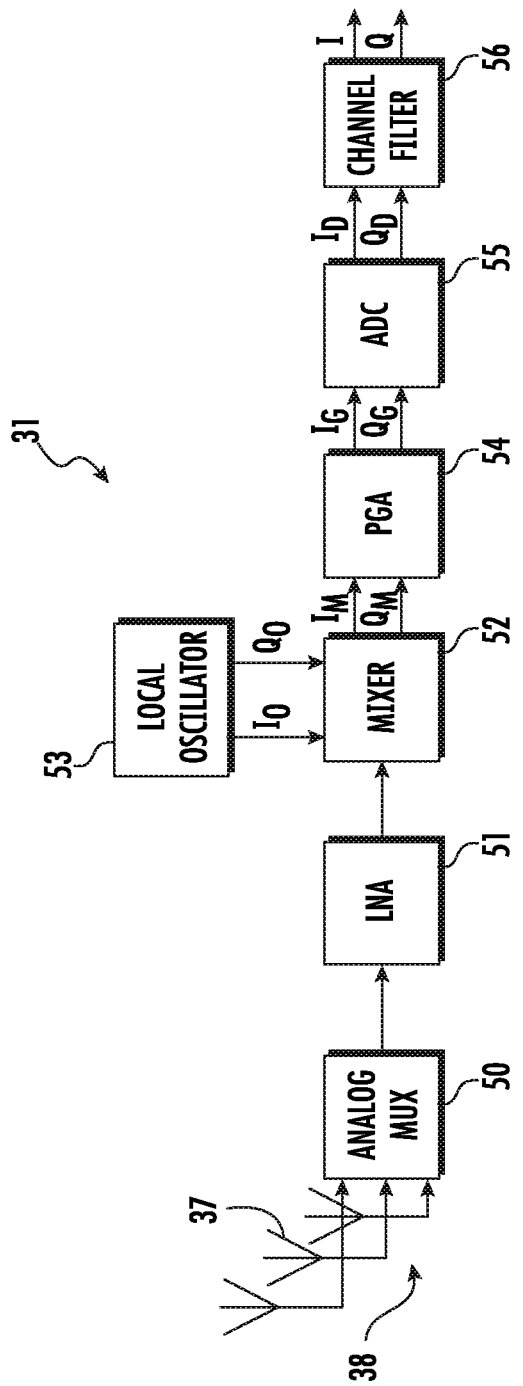
FIG. 2 is a block diagram of the radio receiver of the network device of FIG. 1.

FIG. 2 shows a block diagram of the radio circuit 31. The wireless signals first enter the radio circuit 31 through one antenna element 37 of the antenna array 38. The antenna array 38 may be a one dimensional array, such as a linear array. Alternatively, the antenna array 38 may be a two dimensional array, such as a M×N array. An analog multiplexer 50 may be used to select one antenna element 37 from the antenna array 38. Once selected, this antenna element 37 is in electrical communication with a low noise amplifier (LNA) 51. The LNA 51 receives a very weak signal from the antenna element 37 and amplifies that signal while maintaining the signal-to-noise ratio (SNR) of the incoming signal. The amplified signal is then passed to a mixer 52. The mixer 52 is also in communication with a local oscillator 53, which provides two phases to the mixer 52. The cosine of the frequency may be referred to as $I_o$, while the sin of the frequency may be referred to as $Q_o$. The $I_o$ signal is then multiplied by the incoming signal to create the inphase signal, $I_m$. The $Q_o$ signal is then multiplied by a 90° delayed version of the incoming signal to create the quadrature signal, $Q_m$. The inphase signal, $I_m$, and the quadrature signal, $Q_m$, from the mixer 52 are then fed into programmable gain amplifier (PGA) 54. The PGA 54 amplifies the $I_m$ and $Q_m$ signals by a programmable amount. These amplified signals are referred to as $I_g$ and $Q_g$. The amplified signals, $I_g$ and $Q_g$, are then fed from the PGA 54 into an analog to digital converter (ADC) 55. The ADC 55 converts these analog signals to digital signals, $I_d$ and $Q_d$. These digital signals may pass through channel filter 56 then exit the radio circuit 31 as I and Q signals. In certain embodiments, the I and Q values maybe considered complex numbers, wherein the I value is the real component and the Q value is the imaginary component.

The I and Q signals then enter a CORDIC (Coordination Rotation Digital Computer), which determines the amplitude and phase of the signals. Amplitude is given as the square root of $I^2$ and $Q^2$, while phase is given by the $\tan^{-1}$ (Q/I). The CORDIC may be disposed in the radio circuit 31, or elsewhere within the network interface 30. In certain embodiments, the CORDIC may be implemented in software.

In certain embodiments, the network interface 30 operates on a wireless network that utilizes the Bluetooth network protocol. FIG. 3A shows the format of a special Bluetooth packet that is used for direction detection. These packets typically begin with a preamble 300, an address field 310, a payload 320 and a checksum or CRC 330. However, the special packets also include a constant tone extension (CTE) 340. FIGS. 3B and 3C show two different formats for the CTE 340. In both formats, the CTE 340 includes a guard period 341, a reference period 342, and a plurality of switch slots 343 and sample slots 344. The duration of each switch slot 343 and sample slot 344 may be 1 μsec or 2 μsec, as shown in FIGS. 3B and 3C, respectively. The CTE 340 is a special extension to the Bluetooth packet that transmits a constant frequency, such as a 250 kHz tone. For example, the CTE 340 may be a string of consecutive "1"s. The CTE 340 may be as long as 160 μsec and as short as 16 μsec. In practice, the network device 10 uses a single antenna element 37 of the antenna array 38 to receive the CTE 340 during the guard period 341 and the reference period 342. The network device 10 then switches to another antenna element 37 during each switch slot 343 by changing the selection of the analog multiplexer 50 in the radio circuit 31. The network device 10 samples the tone again with that new antenna element 37 during the sample slot 344. The network device 10 continues switching the antenna element 37 during each switch slot 343 and sampling the tone during the sample slot 344. If there are more sample slots 344 than antenna elements, the network device 10 may return to the first antenna element 37 and repeat the sequence. One set of samples, wherein each antenna element has been used to sample the CTE 340 exactly once may be referred to as a snapshot.

During the entirety of the CTE 340, the sending device is transmitting a tone at a constant known frequency. As stated above, the network device 10 may receive that tone using one antenna element 37 of the antenna array. Specifically, the guard period 341 and the reference period 342, which have a combined duration of 12 μsec, are received using the same antenna element 37.

The network device 10 then performs the steps described above to generate the I and Q signals. In certain embodiments, the processing unit 20 samples the I and Q signals at a very high rate, such as 8 times or more faster than the frequency of the incoming tone. For example, if the incoming tone is 250 kHz, an oversample rate of 4.0 MHz (sixteen times oversampling) or 8.0 MHz (thirty two times oversampling) may be used. The I and Q signals then enter a CORDIC, which determines the amplitude and phase of the signals. Amplitude is given as the square root of $I^2$ and $Q^2$, while phase is given by the $\tan^{-1}$ (Q/I).

Figure 4:
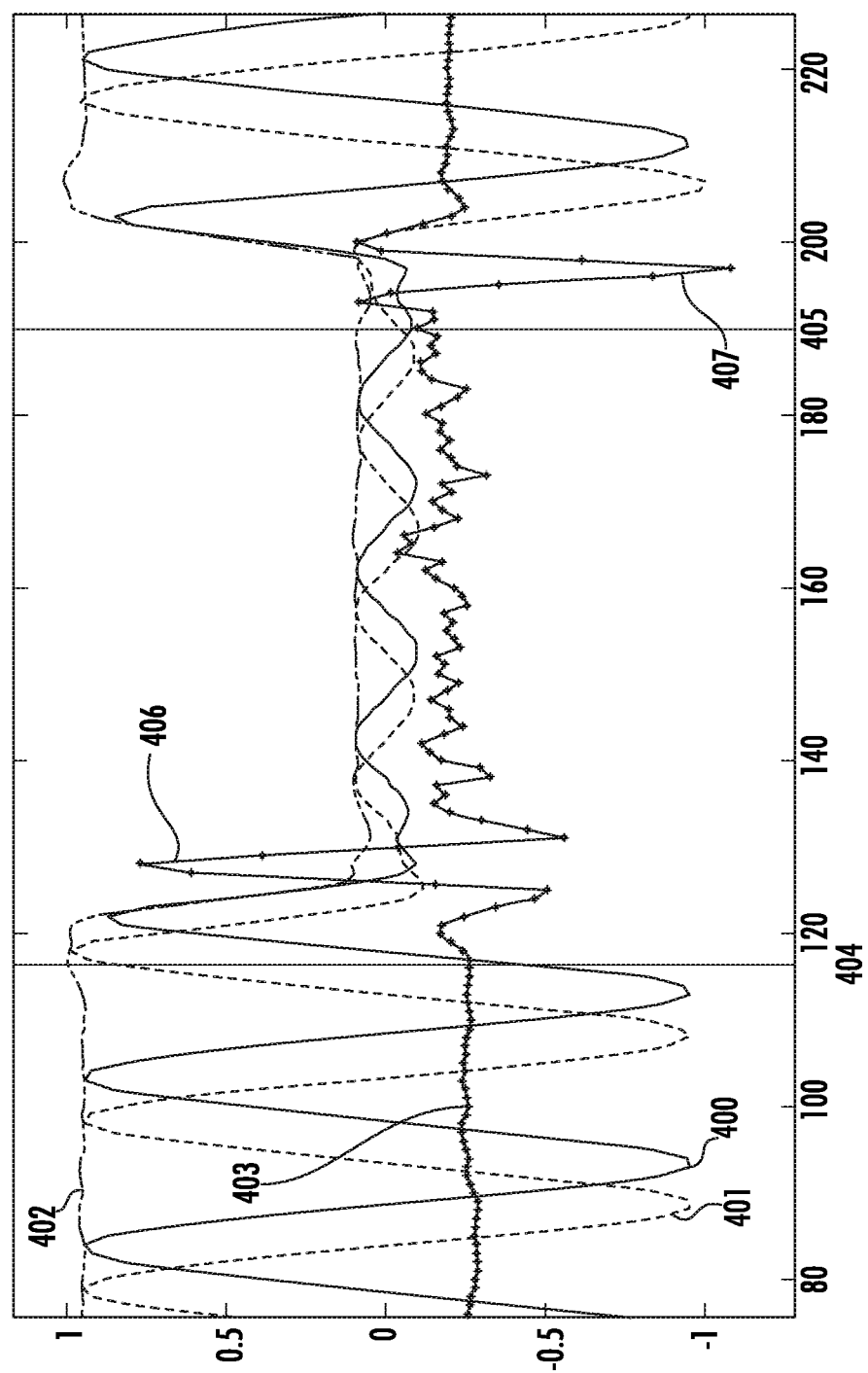
FIG. 4 shows the I signal, the Q signal, the amplitude and the phase during one antenna switching pattern.

Ideally, when the analog multiplexer 50 is switched to a different antenna element, the I and Q signals would immediately track the new antenna element. However, this is not true in all cases. FIG. 4 shows the I signal 400, the Q signal 401, the amplitude 402 and the phase 403. In this diagram, the analog multiplexer 50 switches from a first antenna element to a second antenna element at time 404. The analog multiplexer 50 switches from the second antenna element to a third antenna element at time 405.

In this example, the amplitude of the signal from the first antenna element and the amplitude of the signal from the third antenna element are roughly equal. The amplitude of the signal from the second antenna element is roughly 20 dB less than the signal from the other two antenna elements. Additionally, the phase of the signals from the three antenna elements is roughly the same.

Note that at time 404, when the analog multiplexer 50 switches to the second antenna element, the amplitude drops relatively quickly, as expected. However, note as well that there is a large phase spike 406. This is caused by the inability of all components in the read channel to immediately adapt to the new amplitude. As noted above, inductive and capacitive elements in the read channel cannot change instantaneously, leading to the phase spike 406. In this graph, data was sampled at 4.8M samples per second. Further, the settling time of the phase 403 after time 404 is roughly 18 samples, or about 3.75 μseconds. Another phase spike 407 occurs at time 405, when switching from the second antenna element to the third antenna element. Again, the settling time is roughly 18 samples.

Note that if the phase signal does not settle quickly enough, the results of any direction finding algorithm, such as MUSIC, may be inaccurate.

Figure 5:
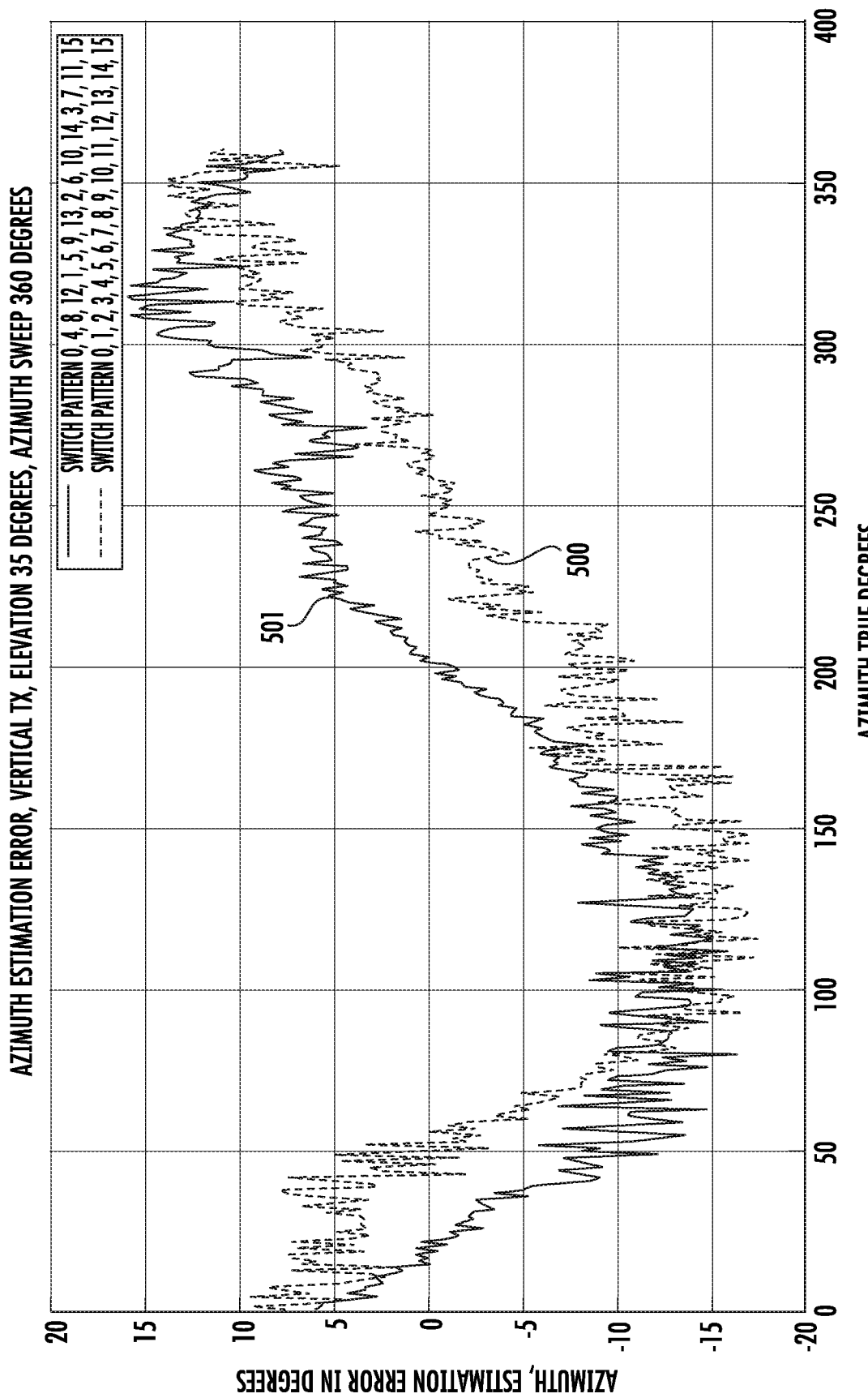
FIG. 5 shows the error profile for two different antenna switching patterns.

FIG. 5 shows a graph that illustrates this phenomenon. A beacon was disposed proximate a test device in a controlled environment. For example, the environment may be configured such that the measurements can be made without any multi-path interference. The test device was placed on a turntable, so that it rotated at least 360°. As the test device was being rotated, it captured I and Q signals and computed the angle of arrival (AoA) based on these I and Q signals. This computed angle can then be compared to the actual angle of arrival which can be empirically derived based on the azimuth angle of the test device and the actual position of the beacon.

In FIG. 5, the horizontal axis represents the azimuth angle of the test device as it is being rotated. In this test, the antenna array of the test device was a 4×4 array. The vertical axis represents the difference between the actual angle of arrival and that computed by the device at that azimuth angle. In other words, a value of 0 on the vertical axis indicates that the computed angle of arrival was exactly the same as the actual angle of arrival. Line 500 shows the azimuth error for a first antenna switching pattern. In this first antenna switching pattern, all of the antenna elements in the first row are sequenced, then all of the antenna elements in the second row are sequenced. This repeats for the third and fourth rows as well. Line 501 shows the azimuth error for a second antenna switching pattern. In this second antenna switching pattern, all of the antenna elements in the first column are sequenced, then all of the antenna elements in the second column are sequenced. This repeats for the third and fourth columns as well. Thus, if the antenna elements are numbered 1-4 in the first row, 5-8 in the second row, 9-12 in the third row and 13-16 in the fourth row, the first antenna switching pattern would select the antenna elements in the following order: 1, 2, 3, 4, 5, 6, 7, 8, 9, 10, 11, 12, 13, 14, 15, 16. The second antenna switching pattern would select the antenna elements in the following order: 1, 5, 9, 13, 2, 6, 10, 14, 3, 7, 11, 15, 4, 8, 12, 16.

Each line of this graph may be referred to as the error profile of that antenna switching pattern. Note that for certain azimuth angles, the first antenna switching pattern yielded more accurate results. Specifically, for azimuth angles from about 40° to about 90° and from about 230° to about 330°, line 500 (i.e. the first antenna switching pattern) has a smaller absolute error. Similarly, for azimuth angles from about 0° to about 40° and from 120° to about 220°, line 501 (i.e. the second antenna switching pattern) has a smaller absolute error. Other antenna switching patterns may exhibit different results.

In other words, the sequence by which the antenna elements are switched during the CTE 340 affects the accuracy of the AoA measurement. This information can be used in a plurality of different ways.

Additionally, although FIG. 5 shows the effect of different antenna switching patterns as a function of azimuth angle, similar results may also occur at differing elevation angles.

Figure 6:
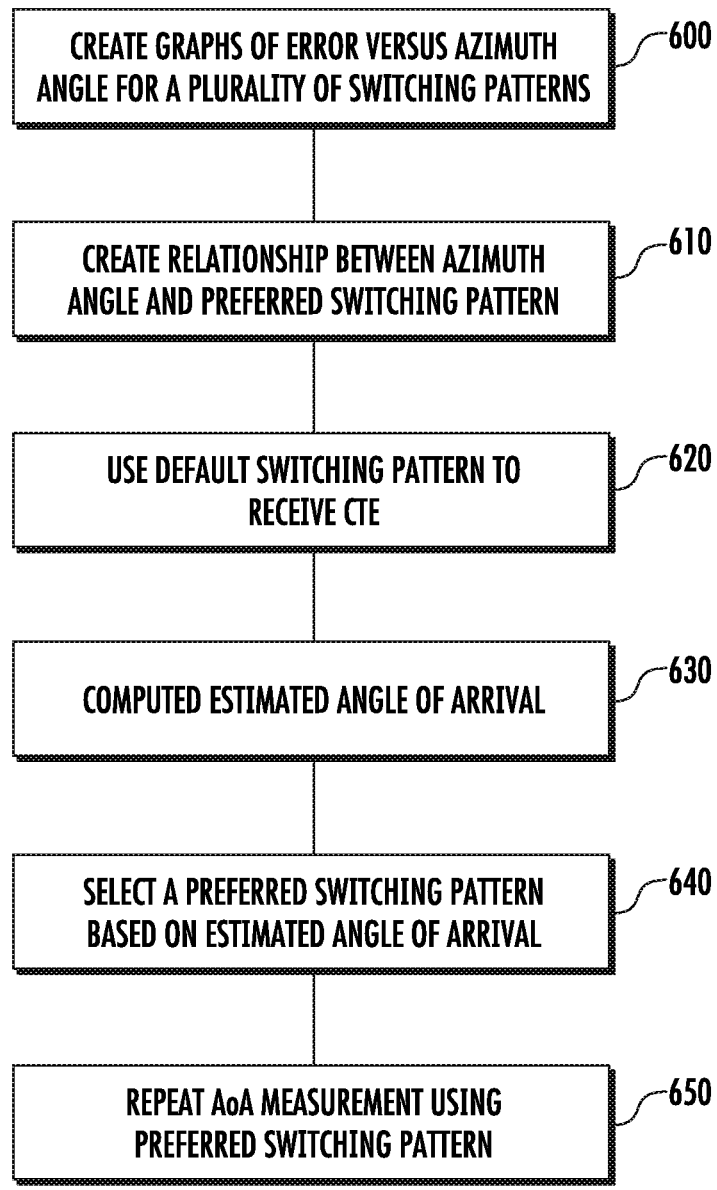
FIG. 6 shows a process of calculating angle of arrival more accurately according to one embodiment.

According to one embodiment, illustrated in Process 600 of FIG. 6, the network device 10 may first create a plurality of graphs, such as those shown in FIG. 5. These graphs are specific to the geometry of the antenna array and the antenna switching pattern. In certain embodiments, the network device 10 does not create these graphs. Rather, they are created using a test device having an identical or a similar antenna configuration. After creating the plurality of graphs, a relationship may be created between the estimated angle of arrival and preferred antenna switching pattern, as shown in Process 610. For example, in FIG. 5, the network device 10 may create a relationship where the second antenna switching pattern is used if the estimated AoA is between 0° and 40° or between 120° and 220°. The network device 10 may also conclude that the first antenna switching pattern is used for all other estimated angles. Of course, if more than two antenna switching patterns are created, the relationship may be more complex. This relationship may be expressed in a variety of ways. In one embodiment, the network device 10 may create a table which associates each azimuth angle with a preferred antenna switching pattern. In certain embodiments, to save memory space, the table may associate ranges of azimuth angles with a preferred antenna switching pattern. For example, the table may group azimuth angles in groups of 5°, for example. In another embodiment, the relationship may be represented in a different manner.

The network device 10 may then use a default antenna switching pattern to receive at least a portion of the CTE 340, as shown in Process 620. For example, the network device 10 may obtain I and Q signals at a plurality of sample slots 344, where the sample slots are associated with the plurality of antenna elements. In certain embodiments, the network device 10 obtains at least one set of I and Q signals for each antenna element in the antenna array.

Using a direction finding algorithm, such as MUSIC, the network device 10 may compute the estimated angle of arrival, as shown in Process 630. Methods of determining an estimate angle of arrival based on the obtained I and Q signals from a plurality of sample slots are well known and therefore are not described further.

Based on this estimated angle of arrival, the device may then select a preferred antenna switching pattern, based on the relationship created above, as shown in Process 640. The network device 10 then repeats the AoA measurement using this preferred antenna switching pattern, as shown in Process 650. Repeating the AoA measurement involves receiving the CTE 340, obtaining the I and Q signals associated with each antenna element during at least one of its respective sample slots using the preferred antenna switching pattern, and executing an AoA algorithm, such as MUSIC, using these I and Q signals.

In certain embodiments, the Processes 630-650 may be repeated a plurality of time to further improve the accuracy of the result. Specifically, the angle of arrival calculated in Process 650 may be used to select an updated preferred antenna switching pattern by repeating Process 640. This updated preferred antenna switching pattern is then used to calculate an improved angle of arrival, as shown in Process 650.

This approach may be more effective in environments without multi-path interference.

However, other methods may also be employed.

Figure 7A:
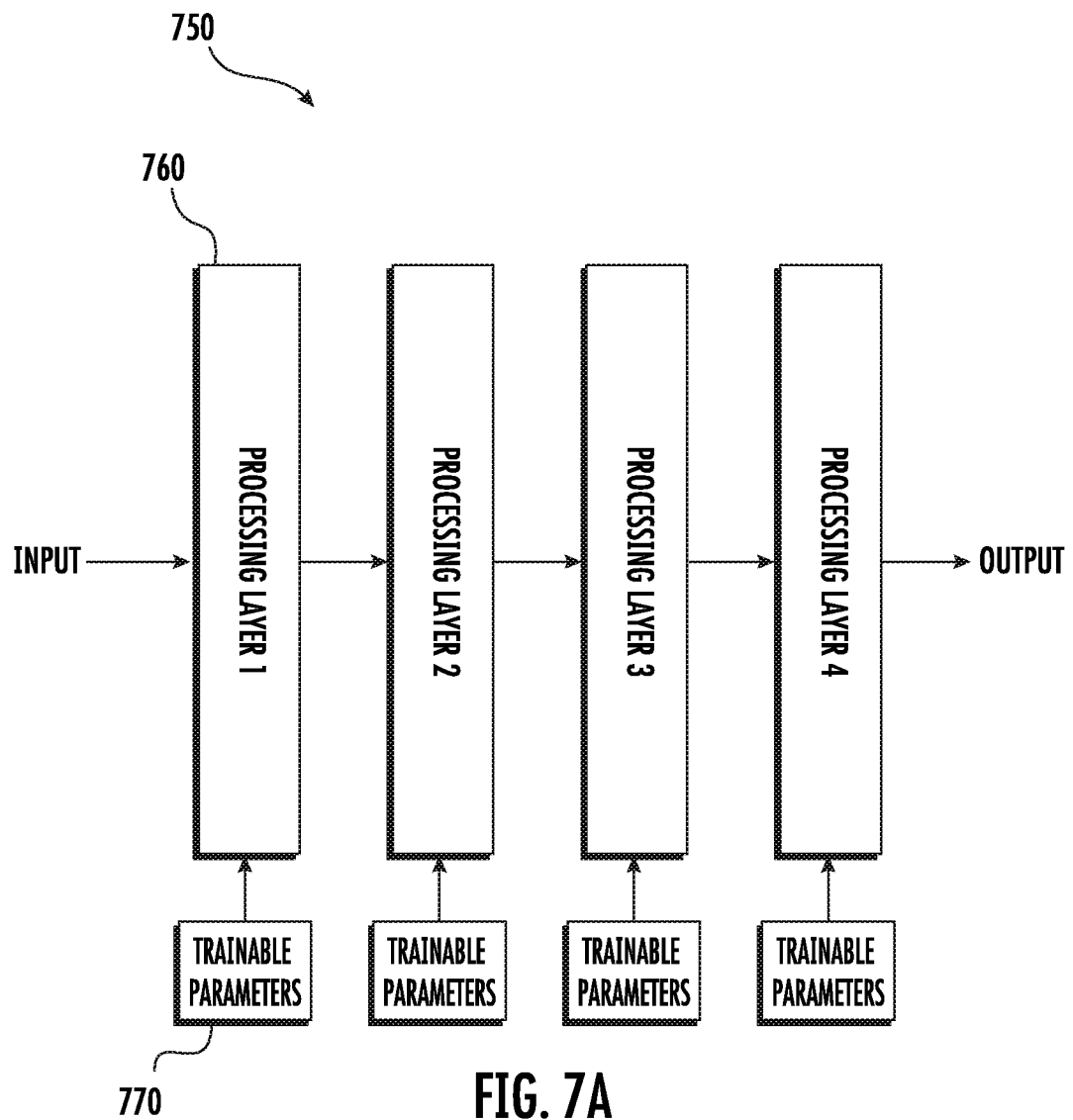
FIG. 7A shows a neural network.
Figure 7B:
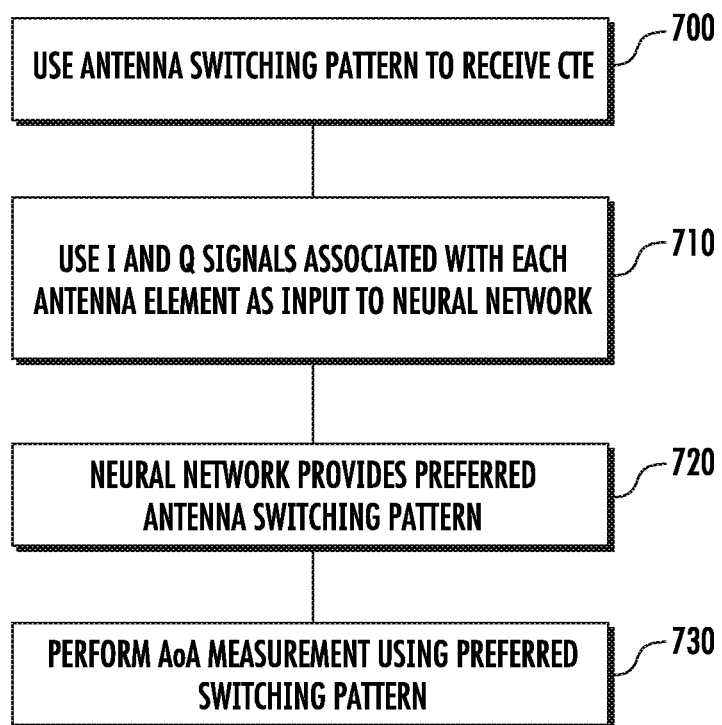
FIG. 7B shows a process of calculating angle of arrival more accurately according to a second embodiment.

In another embodiment, shown in FIGS. 7A-7B, the device may use machine learning to select the preferred antenna switching pattern. FIG. 7A shows the configuration of a neural network, while FIG. 7B shows the operation of the device in this embodiment. The neural network 750 may comprise one or more processing layers 760. A processing layer 760 may be a convolutional layer or a fully connected layer. In either configuration, there are trainable parameters 770 that are used to teach the neural network 750.

In this embodiment, the input to the neural network 750 may be the I and Q signals obtained from each of the sample slots. Specifically, the I and Q signals may be received from the various antenna elements during the CTE 340 using the default antenna switching pattern, as shown in Process 700. For example, the network device 10 may obtain I and Q signals at a plurality of sample slots 344, where the sample slots are associated with a plurality of antenna elements. In certain embodiments, the network device 10 obtains at least one set of I and Q signals for each antenna element in the antenna array.

Next, these I and Q signals may be supplied to a neural network 750 which is disposed in the network device 10, as shown in Process 710.

The neural network 750 may then provide an indication of which antenna switching pattern would be preferable given the supplied I and Q signals, as shown in Process 720. For example, the neural network 750 may have one or more outputs, where each output is representative of the confidence level associated with using a specific antenna switching pattern. For example, the neural network 750 may indicate that the first switching pattern is preferred with a confidence level of 72%, while the second switching pattern is preferred with a confidence level of 28%. In this instance, the network device 10 would select the first antenna switching pattern as the preferred antenna switching pattern.

In this embodiment, it is not necessary to compute an estimated angle of arrival. Rather, the neural network 750 may be trained using only I and Q signals from the various antenna elements to select the preferred antenna switching pattern. In certain embodiments, a plurality of antenna switching patterns may be predefined, such as is described with respect to FIG. 5 and Process 600 of FIG. 6. Using this information, the neural network may be trained using I and Q signals. For example, as described above, a beacon may be disposed in a fixed location and a test device may be rotated about 360° of azimuth angle. The I and Q signals received by the test device at each angle may be used as training data. Further, the preferred antenna switching pattern (as determined above) may be supplied as the ground truth to the neural network 750 during the training. After being trained, the neural network 750 is able to provide an indication of the preferred antenna switching pattern for any set of I and Q signals. The preferred antenna switching pattern is then used to perform the AoA measurement, as shown in Process 730. Performing the AoA measurement involves receiving the CTE 340, obtaining the I and Q signals associated with each antenna element during at least one of its respective sample slots, and performing an AOA algorithm, such as MUSIC, using these I and Q signals.

In certain embodiments, Processes 700-720 may be performed a plurality of times to improve the accuracy of the results. For example, after the neural network 750 provides an indication of the preferred antenna switching pattern, the network device 10 may then use this preferred switching pattern to receive a CTE 340, as shown in Process 700. The I and Q signals obtained during this CTE 340 may then become updated inputs to the neural network 750, as shown in Process 710. As shown in Process 720, the neural network 750 then provides an undated preferred antenna switching pattern, which can be used to perform the AoA measurement.

Figure 8:
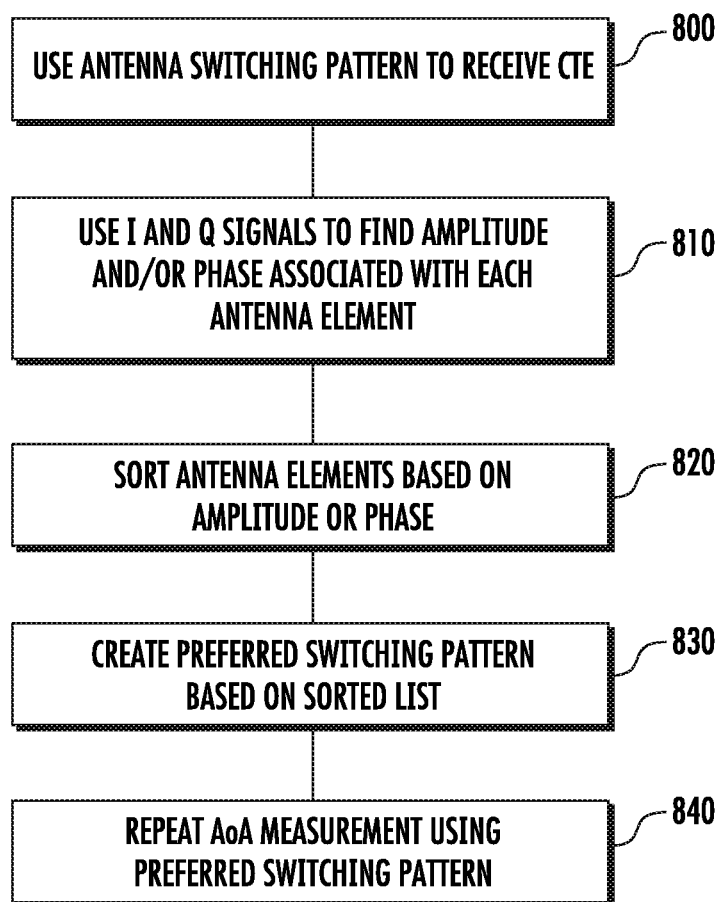
FIG. 8 shows a process of calculating angle of arrival more accurately according to a third embodiment.
Figure 9A:
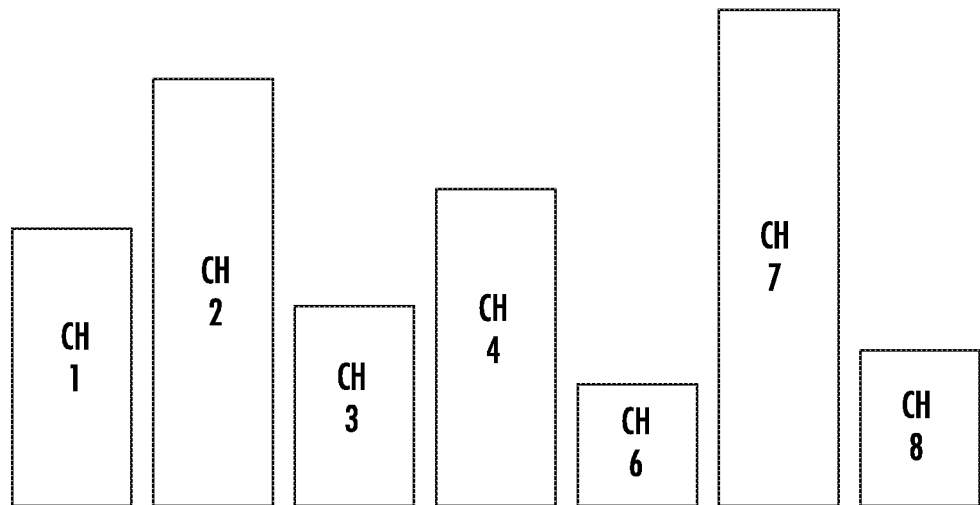
FIG. 9A shows the amplitude of the signals from a plurality of antenna elements of an antenna array.

FIG. 8 shows another procedure that may be used to create a preferred antenna switching pattern. In this embodiment, there are no pre-defined antenna switching patterns. Rather, the network device 10 receives the CTE 340, as shown in Process 800. This may be performed using the default antenna switching pattern. For example, the network device 10 may obtain I and Q signals at a plurality of sample slots 344, where the sample slots are associated with a plurality of antenna elements. In certain embodiments, the network device 10 obtains at least one set of I and Q signals for each antenna element in the antenna array. The network device 10 then uses these sets of I and Q signals obtained during the CTE 340 to calculate at least one parameter associated with the signal associated with each antenna element, as shown in Process 810. These parameters may include the amplitude and/or phase. In certain embodiments, only one of these two parameters is calculated. FIG. 9A shows a representative graph showing an antenna array having 8 antenna elements, and the amplitude of the signal associated with each antenna element in the antenna array.

Figure 9B:
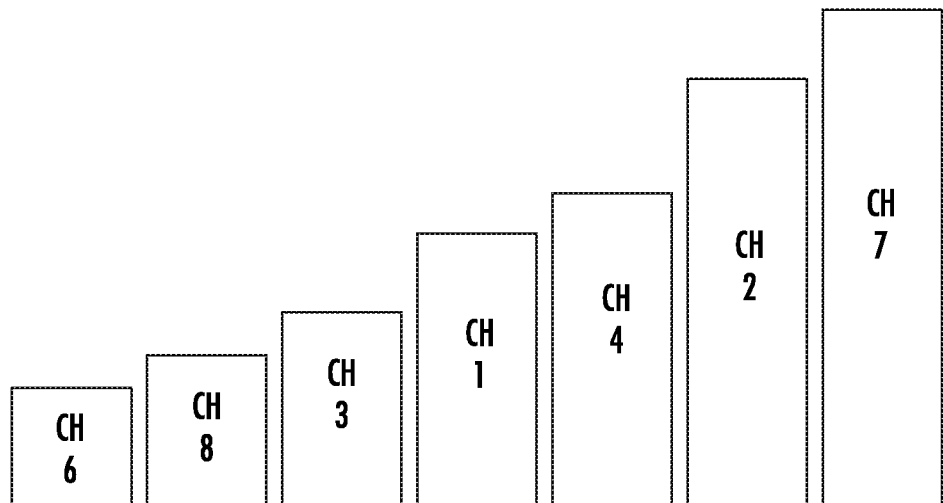
FIG. 9B shows the amplitude of the signals from the plurality of antenna elements after sorting.

The network device 10 then sorts the antenna elements based on amplitude or phase of the respective I and Q signals, as shown in Process 820. The antenna elements may be sorted in ascending or descending order. FIG. 9B shows the antenna elements of FIG. 9A sorted in ascending order of amplitude. The sorted list is then used to define the preferred antenna switching pattern, as shown in Process 830. In other words, in the example shown in FIG. 9B, the preferred antenna switching pattern may be defined as: 6, 8, 3, 1, 4, 2, 7.

The network device 10 then performs an AoA measurement using this preferred antenna switching pattern, as shown in Process 840. Performing the AoA measurement involves receiving the CTE 340, obtaining the I and Q signals associated with each antenna element during at least one of its respective sample slots, and performing an AOA algorithm, such as MUSIC, using these I and Q signals.

In certain embodiments, the order of the sorted antenna elements may not be strictly ascending or descending. Rather, the antenna elements may be sorted so that the difference in amplitude or phase between two adjacent antenna elements in the list is less than a predetermined threshold.

If desired, rather than calculating the AoA, the network device 10 may repeat Processes 800-830 one or more additional times to refine the preferred antenna switching pattern. Specifically, the preferred antenna switching pattern created in Process 830 may be used to sample the CTE. The updated amplitudes and/or phases found in Process 820 may then be sorted into an updated sorted list, similar to Process 830. This updated sorted list is used to create an updated preferred antenna switching pattern, as shown in Process 830, which is then used to calculate an improved angle of arrival, as shown in Process 840.

The angle of arrival or departure may be used for many functions. For example, one angle of arrival locator can be used to locate a beacon. This class of applications may be referred to as wayfinding. For example, the beacon may be a set of car keys or another device that a user needs to find. A user, holding the locator device, may be led to the beacon based on the angle of arrival detected by the locator device. As an example, an automobile may be equipped with Bluetooth. A command may be sent by the owner to the automobile disposed in a parking lot to transmit a beacon or sequence of beacons. The locator device, which is carried by the owner, detects the angle of arrival and can lead the owner toward the automobile in the parking lot. In another embodiments, a shopping mall may install beacons at certain locations, such as near exits, certain stores, or the food court. The shopper may use these beacons to guide their way through the mall using a portable locator device. Similarly, the angle of arrival can be used to guide an operator toward an asset in a warehouse or other structure. The locator device may include an indicator that allows the operator to determine the angle of arrival. For example, the locator device may have a visual display that indicates the direction of the beacon. Alternatively, the locator device may have an audio output that informs the user of the direction of the beacon.

When multiple locators are used, the exact location of the transmitter can be determined. This class of applications is referred to as spatial positioning. For example, inside a structure that has multiple locator devices, the exact location of any transmitter may be determined. This may serve to replace GPS in these environments, as GPS positioning requires more power to execute. In one example, an operator may carry a mobile telephone. A plurality of locator devices each determine the angle of arrival for a beacon transmitted by this phone. In one embodiment, these angles of arrival are forwarded to the mobile phone. In another embodiment, these angles of arrival are forwarded to a centralized computational device, which calculates the position of the mobile phone based on all of the received angles of arrival. Thus, the angle of arrival from each locator device may be used by the mobile phone or another device to pinpoint the specific location of the mobile phone. If a plurality of locator devices are employed, three dimensional spatial positioning may also be possible.

Similar functions can be performed using an angle of departure algorithm. For example, the user may have a device that has a single antenna, rather than an antenna array. If the beacons, such as those described above in the shopping mall or warehouse, utilize an antenna array, the user's device may determine the angle of departure.

The device may also be able to determine the angle of departure from multiple beacons. If the position of the beacons is known, the device may be able to calculate its spatial position from these angles of departure.

In other words, this information can be used in the same manner as angle of arrival information for wayfinding and spatial positioning. Furthermore, the device may have an indicator to provide an indication of the angle of departure to the user. In other embodiments, the device may have an indicator to inform the user of its spatial position.

The present system and method have many advantages. First, in all embodiments, the method described herein results in more accurate angle estimation accuracy. Because the device achieves better accuracy, a reduction in the number of CTE packets may also be possible. This may also result in lower power consumption and faster response time.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A device to calculate an angle of arrival or an angle of departure, comprising:
   a wireless network interface, wherein the wireless network interface comprises an antenna array having a plurality of antenna elements and an analog multiplexer, wherein the wireless network interface receives an incoming signal from an antenna element and generates an I signal and a Q signal associated with the antenna element;
   a processing unit; and
   a memory device, comprising instructions, which when executed by the processing unit, enable the device to:
     receive a packet that includes a constant tone extension (CTE), wherein the CTE comprises a tone having a known frequency and wherein the CTE comprises a plurality of switch slots and a plurality of sample slots;
     sample the CTE during a plurality of the sample slots using a default antenna switching pattern, wherein an antenna switching pattern determines an order in which the analog multiplexer selects each antenna element of the antenna array;
use I and Q signals from the plurality of sample slots to calculate an estimated angle of arrival;
select a preferred antenna switching pattern based on a predetermined relationship between the estimated angle of arrival and a plurality of antenna switching patterns;
sample the CTE during a plurality of the sample slots using the preferred antenna switching pattern; and
use I and Q signals from the plurality of sample slots to calculate an angle of arrival.

2. The device of claim 1, wherein the memory device comprises the plurality of antenna switching patterns.

3. The device of claim 2, wherein the predetermined relationship associates each estimated angle of arrival with one of the plurality of antenna switching patterns.

4. The device of claim 3, wherein the antenna switching pattern associated with each estimated angle of arrival minimizes an absolute error, wherein the absolute error is defined as an absolute value of a difference between the estimated angle of arrival and an actual angle of arrival.

5. The device of claim 2, wherein the predetermined relationship associates ranges of estimated angles of arrival with one of the plurality of antenna switching patterns.

6. The device of claim 5, wherein the antenna switching pattern associated with each range of estimated angles of arrival minimizes an absolute error, wherein the absolute error is defined as an absolute value of a difference between the estimated angles of arrival and actual angles of arrival within the range.

7. The device of claim 1, wherein the angle of arrival calculated using the preferred antenna switching pattern is used to select an updated preferred antenna switching pattern based on the predetermined relationship between the angle of arrival and a plurality of antenna switching patterns; and
wherein the instructions enable the device to:
sample the CTE during a plurality of the sample slots using the updated preferred antenna switching pattern; and
use I and Q signals from the plurality of sample slots to calculate an improved angle of arrival.

8. A method of calculating an angle of arrival or an angle of departure, comprising:
using a device having a wireless network interface, wherein the wireless network interface comprises an antenna array having a plurality of antenna elements and an analog multiplexer, wherein the wireless network interface receives an incoming signal from an antenna element and generates an I signal and a Q signal associated with the antenna element, to receive a packet that includes a constant tone extension (CTE), wherein the CTE comprises a tone having a known frequency and wherein the CTE comprises a plurality of switch slots and a plurality of sample slots;
sampling the CTE during a plurality of the sample slots using a default antenna switching pattern, wherein an antenna switching pattern determines an order in which the analog multiplexer selects each antenna element of the antenna array;
using I and Q signals from the plurality of sample slots to calculate an estimated angle of arrival;
selecting a preferred antenna switching pattern based on a predetermined relationship between the estimated angle of arrival and a plurality of antenna switching patterns;
sampling the CTE during a plurality of the sample slots using the preferred antenna switching pattern; and
using I and Q signals from the plurality of sample slots to calculate an angle of arrival.

9. The method of claim 8, wherein the preferred antenna switching pattern is selected from one of a plurality of antenna switching patterns.

10. The method of claim 8, wherein the predetermined relationship associates each estimated angle of arrival with one of the plurality of antenna switching patterns.

11. The method of claim 8, wherein the predetermined relationship associates ranges of estimated angles of arrival with one of the plurality of antenna switching patterns.

12. The method of claim 8, wherein the predetermined relationship is created by:
disposing a beacon at a fixed location;
rotating a test device having an antenna configuration that is identical to the antenna array of the device, wherein the test device is rotated through 360 degrees of azimuth;
sampling the CTE from the beacon to calculate a computed angle of arrival for a plurality of azimuth angles;
creating an error profile for each of a plurality of antenna switching patterns, wherein the error profile represents a difference between an actual angle of arrival and the computed angle of arrival; and
minimizing the absolute error at each azimuth angle based on the error profiles.

13. The method of claim 12, wherein minimizing the absolute error at each azimuth angle is performed by:
for each antenna switching pattern, determining the difference between an actual angle of arrival and the computed angle of arrival;
selecting the antenna switching pattern having a smallest absolute value of the difference.

14. The method of claim 8, further comprising:
selecting an updated preferred antenna switching pattern using the angle of arrival calculated using the preferred antenna switching pattern, based on the predetermined relationship between the angle of arrival and a plurality of antenna switching patterns;
sampling the CTE during a plurality of the sample slots using the updated preferred antenna switching pattern; and
using I and Q signals from the plurality of sample slots to calculate an improved angle of arrival.

15. A software program, disposed on a non-transitory storage media, comprising instructions, which when executed by a processing unit disposed on a device a wireless network interface, wherein the wireless network interface comprises an antenna array having a plurality of antenna elements and an analog multiplexer, wherein the wireless network interface receives an incoming signal from an antenna element and generates an I signal and a Q signal associated with the antenna element, enable the device to:
receive a packet that includes a constant tone extension (CTE), wherein the CTE comprises a tone having a known frequency and wherein the CTE comprises a plurality of switch slots and a plurality of sample slots;
sample the CTE during a plurality of the sample slots using a default antenna switching pattern, wherein an antenna switching pattern determines an order in which the analog multiplexer selects each antenna element of the antenna array;

use I and Q signals from the plurality of sample slots to calculate an estimated angle of arrival;

select a preferred antenna switching pattern based on a predetermined relationship between the estimated angle of arrival and a plurality of antenna switching patterns;

sample the CTE during a plurality of the sample slots using the preferred antenna switching pattern; and use I and Q signals from the plurality of sample slots to calculate an angle of arrival.

16. The software program of claim 15, further comprising a plurality of antenna switching patterns.

17. The software program of claim 15, wherein the predetermined relationship associates each estimated angle of arrival with one of the plurality of antenna switching patterns.

18. The software program of claim 17, wherein the antenna switching pattern associated with each estimated angle of arrival minimizes an absolute error, wherein the absolute error is defined as an absolute value of a difference between the estimated angle of arrival and an actual angle of arrival.

19. The software program of claim 15, further comprising instructions that enable the device to:

select an updated preferred antenna switching pattern using the angle of arrival calculated using the preferred antenna switching pattern, based on the predetermined relationship between the angle of arrival and a plurality of antenna switching patterns;

sample the CTE during a plurality of the sample slots using the updated preferred antenna switching pattern; and use I and Q signals from the plurality of sample slots to calculate an improved angle of arrival.

* * * * *